United States Patent [19]

Rohrbacher

[11] Patent Number: 5,718,015
[45] Date of Patent: Feb. 17, 1998

[54] MOBILE POWER WASH DEVICE WITH WATER RECLAMATION AND HYDROCARBON REMOVAL APPARATUS

[76] Inventor: Richard D. Rohrbacher, 5104 N. 32nd St., Phoenix, Ariz. 85018

[21] Appl. No.: 797,046

[22] Filed: Feb. 10, 1997

Related U.S. Application Data

[62] Division of Ser. No. 402,835, Mar. 13, 1995, Pat. No. 5,601,659.

[51] Int. Cl.[6] ............................................................. A47L 9/18
[52] U.S. Cl. ................................. 15/321; 15/353; 210/284
[58] Field of Search ....................... 15/321, 353; 210/284, 210/693

[56] References Cited

U.S. PATENT DOCUMENTS

| | | |
|---|---|---|
| 1,628,141 | 5/1927 | Gray . |
| 1,784,314 | 8/1930 | Potter . |
| 2,435,510 | 2/1948 | Rabjohn .................... 210/284 X |
| 2,635,277 | 4/1953 | Belknap . |
| 3,079,285 | 2/1963 | Rockwell . |
| 3,616,917 | 11/1971 | Hellwege . |
| 3,652,014 | 3/1972 | Neville . |
| 3,683,945 | 8/1972 | Weisser . |
| 3,753,777 | 8/1973 | Thomsen et al. . |
| 3,764,527 | 10/1973 | Sohl ............................ 210/693 X |
| 3,829,019 | 8/1974 | Petsch . |
| 3,848,804 | 11/1974 | Prestwich . |
| 3,904,528 | 9/1975 | Yocum . |
| 3,919,729 | 11/1975 | Cannan . |
| 3,964,925 | 6/1976 | Burgoon . |
| 4,000,538 | 1/1977 | Tissier . |
| 4,014,467 | 3/1977 | Ferguson . |
| 4,107,816 | 8/1978 | Matthews . |
| 4,133,072 | 1/1979 | Face, Jr. . |
| 4,158,575 | 6/1979 | Townsend . |
| 4,164,055 | 8/1979 | Townsend ........................ 15/321 |
| 4,191,589 | 3/1980 | Halls et al. . |
| 4,191,590 | 3/1980 | Sundheim . |
| 4,194,263 | 3/1980 | Herpers et al. . |
| 4,219,155 | 8/1980 | Goerss . |
| 4,264,450 | 4/1981 | Ayers et al. ................... 210/693 X |
| 4,337,784 | 7/1982 | Goerss . |
| 4,339,840 | 7/1982 | Monson . |
| 4,377,017 | 3/1983 | Herpers et al. . |
| 4,377,018 | 3/1983 | Cain . |
| 4,379,031 | 4/1983 | Krotkiewicz et al. . |
| 4,391,450 | 7/1983 | Beck . |
| 4,439,954 | 4/1984 | Bennett . |
| 4,463,957 | 8/1984 | Nagai et al. . |

(List continued on next page.)

FOREIGN PATENT DOCUMENTS

| | | |
|---|---|---|
| 2 667 087-A1 | 9/1990 | France . |
| 2 024 611 | 1/1980 | United Kingdom . |

OTHER PUBLICATIONS

Derwent English Langange Abstract of France Patent No. 2 667 087.

*Primary Examiner*—Chris K. Moore
*Attorney, Agent, or Firm*—Brinks Hofer Gilson & Lione

[57] ABSTRACT

A cyclonic power wash system and method of using the system to clean flat surfaces. The cyclonic power wash system uses high pressure, high temperature water for selectively cleaning large, flat, concrete or asphalt surfaces. The sprayed water is reclaimed by vacuuming it through holes in the bottom of a reclamation ring attached to the underside of the mobile cyclone sprayer, filtering the vacuumed water and returning it to a storage tank for re-use by the system. The filtration tank initially filters out large matter in an inlet trough and smaller matter in a plurality of cascading chambers. Removably constrained within each chamber of the filtration tank and in each downstream canister filter is at least one bag or pillow filled with water insoluble, hydrocarbon absorbent, substantially polypropylene material which absorbs oil, fuel and other hydrocarbon substances suspended in or floating on the water passing therethrough. Periodically, the bags are removed, the absorbed hydrocarbons are removed therefrom, such as, by squeezing the bags, the removed hydrocarbons are separately collected, and the bags are reused.

8 Claims, 4 Drawing Sheets

U.S. PATENT DOCUMENTS

| | | |
|---|---|---|
| 4,466,155 | 8/1984 | Grave . |
| 4,537,639 | 8/1985 | Shook . |
| 4,652,368 | 3/1987 | Ennis et al. . |
| 4,696,075 | 9/1987 | Grave . |
| 4,715,539 | 12/1987 | Steele . |
| 4,836,561 | 6/1989 | Lebeck et al. . |
| 4,887,395 | 12/1989 | Lebeck et al. . |
| 4,923,120 | 5/1990 | Hammelmann . |
| 4,934,254 | 6/1990 | Clark et al. . |
| 4,974,282 | 12/1990 | Stoltz et al. . |
| 4,997,192 | 3/1991 | Nagai et al. . |
| 5,028,004 | 7/1991 | Hammelmann . |
| 5,080,378 | 1/1992 | Kagawa . |
| 5,087,357 | 2/1992 | Villa ................................ 210/284 X |
| 5,135,015 | 8/1992 | Young . |
| 5,165,699 | 11/1992 | Shrontz et al. . |
| 5,165,821 | 11/1992 | Fischer et al. . |
| 5,174,614 | 12/1992 | Kaleniecki . |
| 5,186,831 | 2/1993 | Depetris . |
| 5,203,575 | 4/1993 | Azibert et al. . |
| 5,250,197 | 10/1993 | Marcel . |
| 5,253,809 | 10/1993 | Poppitz et al. . |
| 5,264,134 | 11/1993 | McCamy ............................ 210/924 X |
| 5,265,805 | 11/1993 | Artenian . |
| 5,302,210 | 4/1994 | Whyte . |

ROTATED 180°

MOBILE POWER WASH DEVICE WITH WATER RECLAMATION AND HYDROCARBON REMOVAL APPARATUS

This application is a division of U.S. Ser. No. 08/402, 835, filed Mar. 13, 1995, now U.S. Pat No. 5,601,659.

BACKGROUND OF THE INVENTION

1. Fields of the Invention

The present invention relates generally to a mobile power wash system that uses reclaimed, filtered and recycled sprayed water for cleaning flat surfaces such as concrete, asphalt, and other various hard surfaces, and more particularly, to a wash system having an apparatus to remove hydrocarbons, especially oil and fuel, from the recycled water. The power wash system with these new and improved features provides more effective and convenient cleaning of flat surfaces.

2. Discussion of Background and Prior Art

Apparatus and methods for selectively cleaning flat surfaces using a mobile cyclonic power wash system have been well known in the art. The mobile cyclonic power wash system generally sprays water at high rotating speeds to clean the surfaces. A typical mobile cyclonic power wash system includes a water storage means for holding the water to be used for cleaning, a water pumping system used for pumping and pressurizing the water from the storage means, and a water cyclone sprayer for spraying the water onto the surfaces. This power wash system can further include a water heating system for heating the water so that high temperature as well as high pressure water is provided for cleaning surfaces.

Halls et al. U.S. Pat. No. 4,191,589 ("Halls") and Sundheim U.S. Pat. No. 4,191,590 ("Sundheim") each disclosed a power wash system that uses a vacuum system, and these systems were designed to be used for cleaning carpets and hard surfaces such as streets and floors. Goerss U.S. Pat. No. 4,337,784 ("Goerss") disclosed a high pressure water system that is designed to be used for cleaning floor surfaces and floor gratings.

One of the problems with the prior art power wash systems is that none of them provided any means for recovering, filtering, and recycling the water sprayed by the power wash system. The prior art systems were not designed to be independent, self-contained systems in which the water is continuously reclaimed, filtered, and recycled for further use by the power wash system. Therefore, the operation of the prior art systems is limited by the amount of water that can be stored or transported by the system (i.e. by the capacity of the water storage means), and the operator of the system was inconvenienced in having to replenish additional water from an outside source when stored water was depleted. In effect, these prior art systems required the use of large amounts of water, and these systems wasted the stored water since they did not have the capability of reclaiming and re-using it. Moreover, environmental objections are increasingly being raised to harmful wastes being dumped into local drainage systems. Thus, there is a need to reclaim the sprayed water used in outdoor cleaning systems.

Applicant's co-pending application Ser. No. 08/118,139 filed Sep. 8, 1993, discloses and claims an improved power wash system which uses high pressure and high temperature water to selectively clean large flat surfaces of the type referred to above, including large parking lots and garages, airport aprons and runways and the like. That system features a water reclamation, filtering and recycling system that dramatically cleans the recycled water and results in substantially improved and efficient surface cleaning. The entire disclosure of that application is hereby incorporated by reference.

Applicant has found that its system described in its co-pending application is very effective in lifting out of the surfaces to be cleaned large amounts of hydrocarbons, such as, oil and fuel which accumulates from the tires and drippings of the vehicles which use the surfaces, especially, for example, the skid marks of tires in the landing zone of runways, oil leaks from parked cars and the like. These hydrocarbons become suspended in the recycled water and also float on the surface of the water being recycled for reuse by applicant's system. If not removed from the system, these hydrocarbons may be reapplied elsewhere on the surface being cleaned. Thus, there is a need and it is an object of the present invention to eliminate suspended and floating hydrocarbon substances in or on the recycled water so that the power wash system is able to run continuously and reapply a clear water wash to the surface being cleaned.

An additional problem faced by applicant were the environmental regulations that impose costly safeguards upon those who generate and transport hazardous materials. Reclaimed oil, fuel and other hydrocarbon substances may fall into this category. Thus, there is a need for and it is an object of this invention to provide an apparatus and method of segregating, collecting and storing the reclaimed hydrocarbons such that it could be quickly removed from the system and given back to the owner of the cleaned surface for disposition without the system operator being labeled a hazardous substance generator, storer, or transporter.

SUMMARY OF THE INVENTION

Set forth below is a brief summary of the invention in order to solve the foregoing problems and achieve the foregoing and other objects, benefits, and advantages in accordance, with proposes of the present invention as embodied and broadly described herein.

One aspect of the invention is in a cyclonic power wash system using high pressure water for selectively cleaning flat surfaces in which the system includes a water storage means for holding water to be used for cleaning, a water pumping system for pumping and pressurizing the water from the storage means, a water cyclone sprayer for spraying the water onto the surfaces, and a water reclamation and filter recycling system for reclaiming and filtering the sprayed water and recycling the filtered water back into the water storage means so that it can be further used for cleaning by the power wash system wherein the improvement comprises a plurality of bags of substantially polypropylene, hydrocarbon-absorbent material contained within the water reclamation and filter recycling system for absorbing hydrocarbon substances suspended in or floating on the surface of the recycled water.

A further feature of the invention includes a reclamation system having a plurality of cascading chambers for receiving the reclaimed water and allowing the water to successfully spill over from one chamber to another chamber wherein the improvement further comprises at least one of the bags constrained within each chamber floating on the surface of the water.

A further feature of the invention includes at least one downstream canister filter, wherein the improvement further comprises at least one of the bags in each canister filter.

A further feature of the present invention is that each bag contains about 98.7 % polypropylene material.

A further feature of the present invention is that polypropylene material has been subjected to a carbonation treatment that makes it more porous while remaining insoluble in water.

Another feature of the present invention is water heating system for heating the water to a high temperature.

A further feature of the present invention includes the bags being removable, the hydrocarbons absorbed in the bags being readily removable from the bags and separately collectable;

and the bags being reusable in the filter recycling system for further absorption of hydrocarbon substances.

A further aspect of the present invention is a method of cleaning flat surfaces using a cyclonic power wash system which produces high pressure in which the method includes steps of storing a supply of water in a storage means to be used for cleaning, pumping and pressurizing water from the storage means, spraying the water through a water cyclone sprayer onto the surfaces to be cleaned, reclaiming the water that has been sprayed onto the surfaces; filtering the reclaimed, sprayed water by removing the matter present therein; and, recycling the filtered water back into the water storage means so that it may be further used for cleaning by the power wash system, wherein the improvement comprises the step of:
absorbing hydrocarbons suspended in or floating on the reclaimed water.

A further feature of this aspect of the invention includes absorbing the hydrocarbon in a plurality of substantially polypropylene bags by floating the bags on the surface of the water while constraining at least one bag in each compartment of a filtration tank, and cascading the reclaimed water having suspended and floating hydrocarbons through a series of separate compartments in a filtration tank, each compartment having at least one of the bags constrained therein.

A further feature of this aspect of the invention includes passing the reclaimed water through a canister filter, and;

constraining at least one of the bags in the canister filter while absorbing the hydrocarbon suspended in or floating on the water passing therethrough.

A further feature of this aspect of the invention includes removing the bag from the tank, removing the hydrocarbon from the bag, such as by squeezing the bag; and reusing the bag, and collecting the removed hydrocarbons.

A still further feature of this aspect of the invention is a mobile platform on which the system components are mounted for transport to a job site.

DETAILED DESCRIPTION OF THE PREFERRED EMBODIMENT

Figure 1:
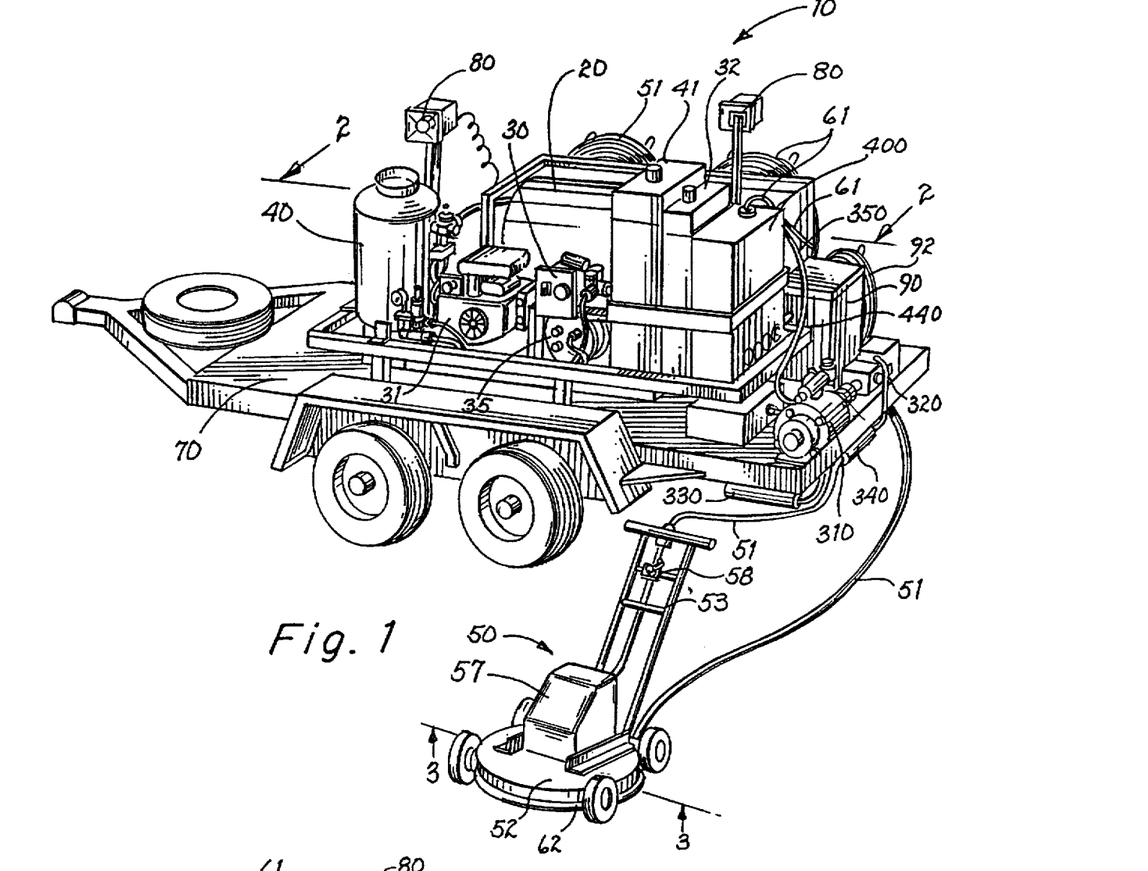
FIG. 1 Front perspective view of a mobile cyclonic power wash system having an improved water reclamation and filter recycling system which uses the hydrocarbon removal apparatus of the present invention.
Figure 2:
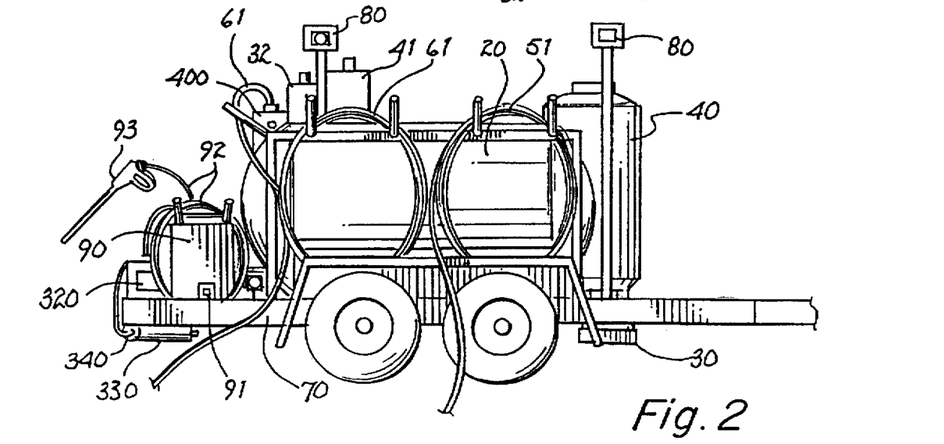
FIG. 2 Rear elevation of the mobile cyclonic power wash system having the improved water reclamation and filter recycling system and hydrocarbon removal apparatus taken along the line 2—2 of FIG. 1.
Figure 4:
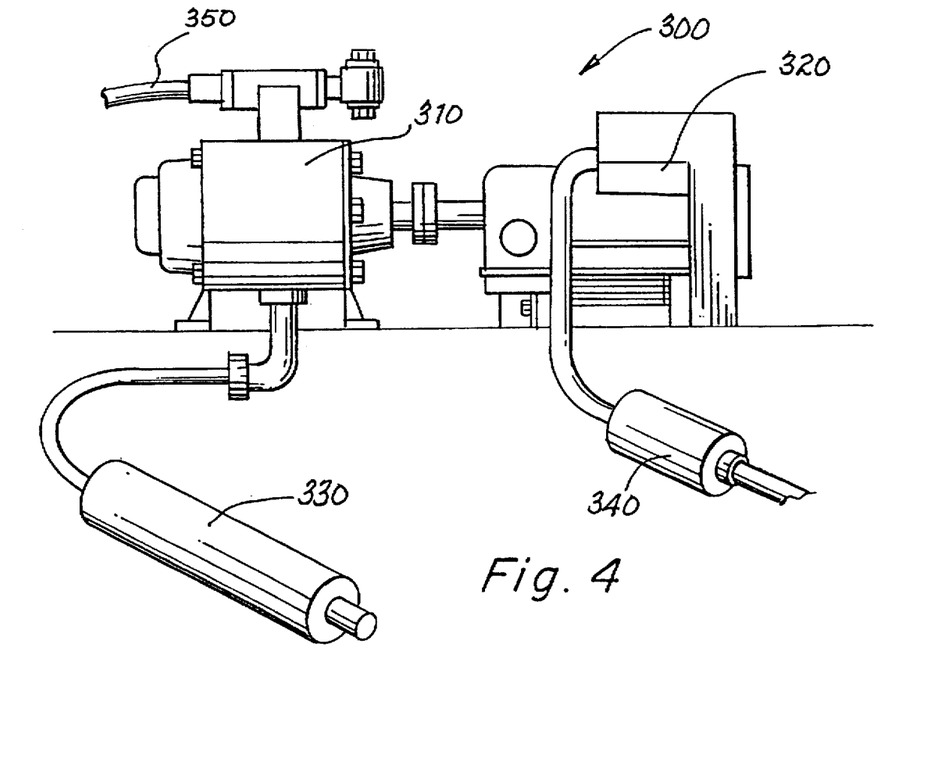
FIG. 4 Front elevation view of the vacuum source for the water reclamation and filter recycling system of the present invention.
Figure 5:
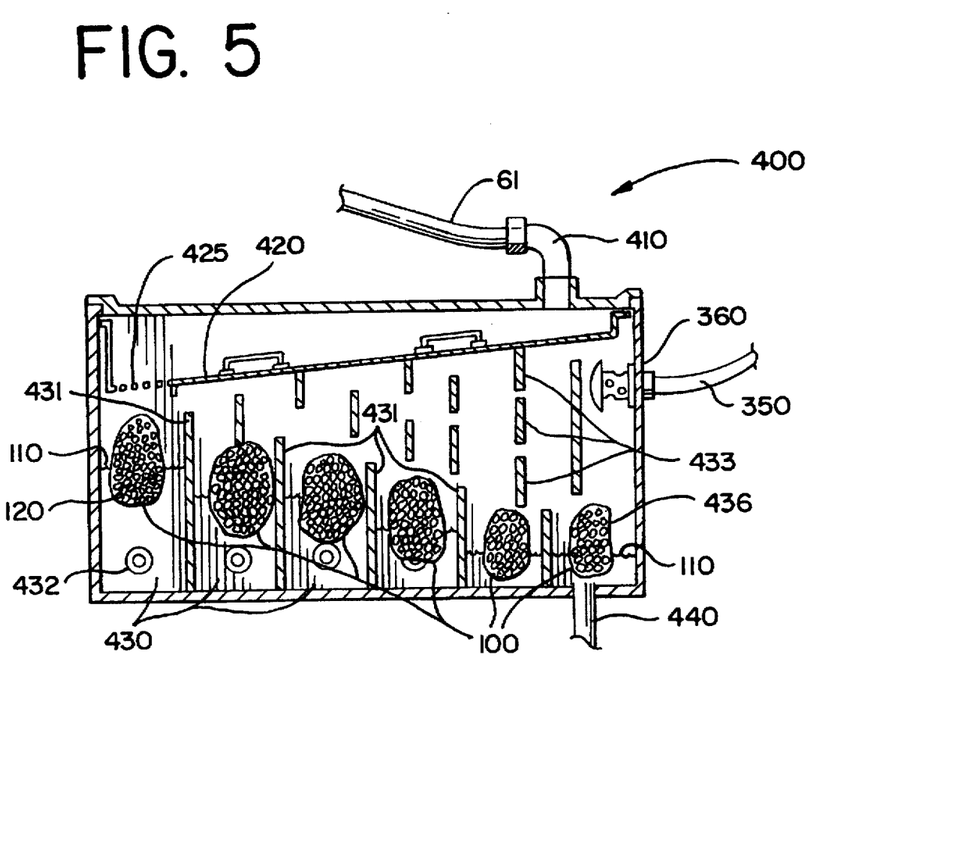
FIG. 5 Front sectional elevation view of the water filtration tank for the water reclamation and filter recycling system with hydrocarbon removal apparatus of the present invention.
Figure 6:
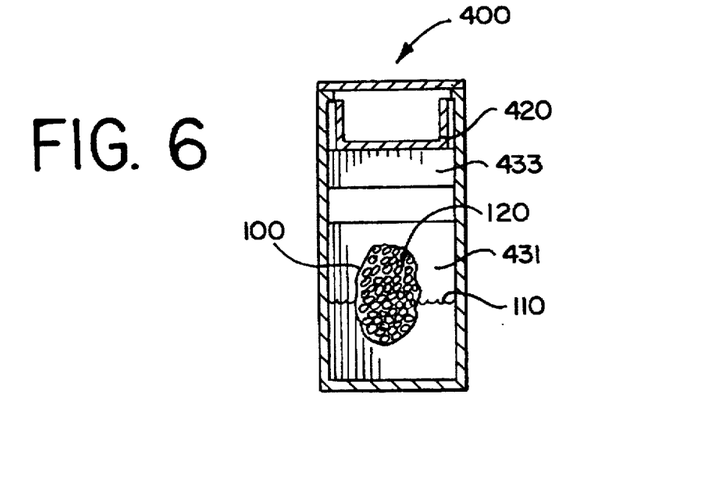
FIG. 6 Side sectional elevation view of the water filtration tank for the water reclamation and filter recycling system taken along the line 5A—5A of FIG. 5.
Figure 7:
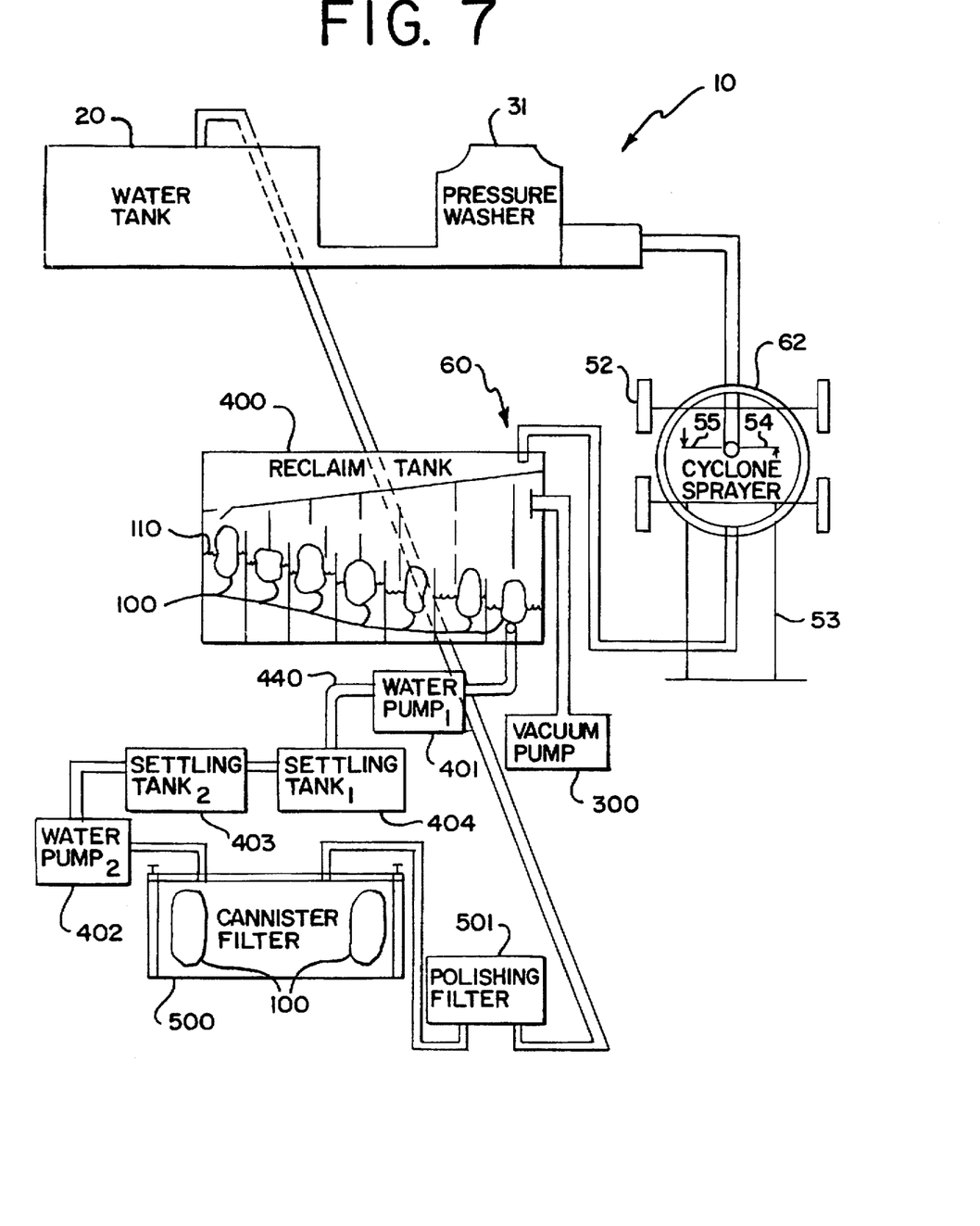
FIG. 7 A schematic diagram of the overall system with hydrocarbon removal apparatus of the present invention.

FIGS. 1 and 2 respectively show front and rear views and FIG. 7 shows a schematic diagram of a mobile cyclonic power wash system 10 which includes the novel water reclamation and system 60 (shown generally in FIG. 3 but also including elements shown in FIGS. 3A, 4, 5 and 6) for reclaiming and filtering water that is sprayed by the system and recycling the filtered water into a storage means 20 so that the water is re-used for cleaning. FIGS. 5 and 6 show the bags or pillows 100, filled with hydrocarbon absorbent material, floating on the surface 110 of the water in the reclamation tank 400 and in the canister filter 500. These features of the power wash system 10 are now described in more detail.

The Power Wash System

As seen in FIGS. 1, 2 and 7 the mobile cyclonic power wash system 10 includes a water storage means 20 for holding the water to be used for cleaning by the system 10, a water pumping system 30 for pumping and pressurizing the water from the storage means 20, a water cyclone sprayer 50 for spraying the water to the surfaces to be cleaned, and a mobile platform 70 on which various system 10 components are mounted so that the power wash system 10 is transportable from job site to job site. A water heater 40 may also be included as part of the power wash system 10 for heating the water and is included in the pressure washer 31 shown schematically in FIG. 7.

As a further option, the power wash system 10 can include a chemical treatment system 90. The treatment system 90 be used prior to operating the power wash system 10 to apply chemicals to the surfaces to be cleaned in order to loosen hard to remove dirt, grease, oil, grime, and the like from these surfaces. The treatment system 90 comprises an independently power operated pump 91 which pumps the chemicals through a hose 92 and to a spray gun 93. The chemicals are then sprayed to the surfaces through spray gun 93.

The power wash system 10 operates by having the water storage means 20 pumped and pressurized by the pumping system 30. The pumping system 30 is typically a water pump that is driven by a gas-powered engine 31 which also powers a generator 35. The water may then be either pumped to a water heater 40 so that the water may be heated or directly pumped to a water cyclone sprayer 50 if no heat is desired. If the water is directed to a water heater 40, then the heater 40, which is powered by the generator 35, burns diesel fuel stored in fuel 41 to heat the water to an operating temperature of 250° F. A thermostatic electrical switch (not shown) turns the oil burner "on" when the water temperature falls to 230° F. and "off" when the temperature rises to 255° F.

Figure 3:
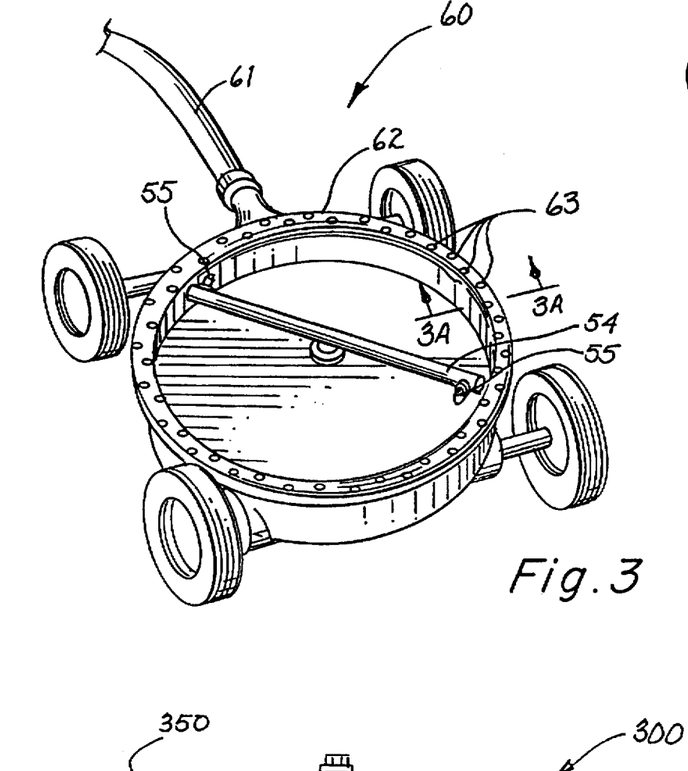
FIG. 3 Bottom perspective view of a water cyclone sprayer with a water reclamation ring attached.

The water is then directed through a water transporting hose 51 and lever type on/off valve 58 to a water cyclone sprayer 50. The water under high pressure and/or high temperature is sprayed through the sprayer 50 onto the surfaces to be cleaned. As shown in FIGS. 1 and 7 the sprayer 50 comprises a mobile base 52 and a handle 53 mounted to base 52 so that the operator can move the sprayer 54 over various surfaces. FIG. 3 shows that the sprayer 50 (turned upside down in FIG. 3) has a spray bar 54 mounted underneath the sprayer 50 within the base 52. The spray bar 54 has nozzles 55 at its ends at an adjustable downward vertical angle of 6°–20° relative to the horizontal through which the water is downwardly sprayed onto the surfaces to be cleaned. A rotary union, is mounted atop the center portion of base 52 underneath cover 57, and the spray bar 54 is attached to the spindle of the rotary union. The horizontal reaction forces to pressure and/or high temperature water passing through the rotary union and exiting through jets 55 causes the spray bar 54 to rotate at a very high speed, and the water is, in effect, sprayed at a downward angle onto the surfaces through nozzles 55 rotating at a high speed. The power wash system 10 is able to clean dirt, grease, oil, grime, and the like from flat surfaces such as asphalt lots and concrete floors. The power wash system 10 can also be adapted to be used at night by having lights 80, powered by generator 35, mounted to the mobile platform 70.

The Water Reclaimation and Filter Recycling System

The improvement described in applicant's co-pending application referenced earlier that has been made to this power wash system 10 is that a water reclamation and filter recycling system 60 has been included as pad of the system 10 to reclaim and filter the water sprayed by the power wash system 10 and to further return the filtered water back to storage means 20 for further use in cleaning by power wash system 10. The reclamation and recycling system 60 comprises a detachable water reclamation ring as shown in FIGS. 3 and 7, a vacuum source 300 as shown in FIGS. 4 and 7, a filtration tank 400 as shown in FIGS. 5 and 7, and as shown in FIG. 7. Further, water pumps 401 and 402 setting tanks 403 and 404, canister filter 500, and polishing filter 501.

Figure 3A:
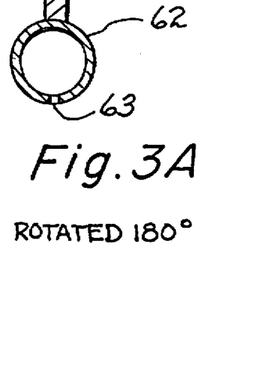
FIG. 3A Cross-sectional view of the water reclamation ring taken along the line 3A—3A of FIG. 3.

As shown in FIG. 3, the ring 62 is mounted to bottom side perimeter of the base 52 of sprayer 50 encircling spray bar 54. After the sprayer 50 sprays the water onto the surfaces, the water can then be reclaimed from the surfaces through this ring 62. As shown in FIGS. 3 and 3A, the ring 62 is hollow and contains a plurality of holes 63, which are on the bottom side the ring 62 and these holes 63 face the surfaces to be cleaned. A transporting hose 61 is attached to an end of ring 62 so that the water can be transported to a filtration tank 400.

The water (along with stones, oil, fuel, hydrocarbons, debris and other matter small enough to fit through holes 63) is vacuumed or sucked through the holes 63 and through the hose 61 to a filtration tank 400 by the use of vacuum source 300 in FIG. 4. Vacuum source 300 comprises a vacuum pump 310 and a gas driven motor 320 which drives and operates the pump 310. The vacuum source 300 may further comprise a silencer 330 attached to the pump 310 and an exhaust muffler 340 attached to the motor 320 so that the vacuum source 300 may be operated with less noise (i.e. for quieter operations in or near residential areas).

The water is then passed through the filtration tank 400 so that the water is filtered and cleaned for re-use by the power wash system 10. As shown in FIGS. 4 and 5, one way of passing the water through the filtration tank 400 is by attaching the inlet 360 of the vacuum source 300 to the clean end of tank 400 (i.e. the right side of tank 400 in FIGS. 5 and 7) using an attaching means 350. The vacuum source creates a low pressure in tank 400, transport hose 61 and reclamation ring 62 which sucks the water through holes 63 of ring 62, through hose 61, and then through the entire tank 400.

As shown in FIGS. 5 and 6, the filtration tank 400 comprises an inlet 410 located at the top, a removable slanting trough 420 located in the upper portion of the tank, a screened trough outlet 425 located at the bottom of trough 420, a plurality of cascading chambers 430 located in the lower portion of the tank, a drain 432 for each chamber 430, and baffles 433 also located in the central portion of the tank between the trough outlet 425 and the vacuum source inlet 360.

The reclaimed water is passed to the tank 400 through inlet 410, and the water flows downwardly along the trough 420 to the screened outlet 425. Large debris and particles are removed from he water when the water passes through screened outlet 425, and the debris and particles are left in the trough 420 in the upper portion of the tank 400. The trough 420 is removable from tank 400 so that the large debris and particles can be easily cleaned from it.

The water is then successively passed to a plurality of cascading chambers 430. The chambers 430 are each separated by a series of dividing walls 431 that are descending in height. The water successively fills each chamber and then flows over to the next adjacent chamber so that debris and particles still present in the water are left in the chambers 430, and cleaner water is continuously passed to the next chamber. The water is then sufficiently cleaned for re-use when it reaches the last chamber 436.

The filtered water exists the tank 400 through outlet 435 located in the last chamber 436 after passing through a one-way, spring loaded, water check valve (not shown) and is transported by gravity feed or by pump 401 through a transport means 440 to storage means 20 so that the filtered water is returned to be further used for cleaning by the power wash system 10. The pump 401 may be automatically operated by a float switch (not shown) which regulates the water level between predetermined high (pump ON) and low (pump OFF) water levels. A drain 432 is provided for each chamber 430 so that the debris and particles that remain in these chambers can be removed.

A plurality of baffles 433 are located below the trough 420 and generally above the chambers 430 to prevent debris, particles, and water from being directly vacuumed into inlet 360 of vacuum source 300. These baffles 433 ensure that the vacuum source 300 and the reclamation and recycling system 60 operate properly.

Enroute from the reclamation tank 400 to the water storage tank 20, as shown in FIG. 7, the filtered water passes through settling tanks 403 and 404 which allow any remaining debris to settle to the bottom of those tanks which may be periodically cleaned (not shown). The reclaimed water is then pumped 402 through a canister filter 500 which also contains several hydrocarbon absorbent bags or pillows 100 before passing to polishing filter 501 which removes any remaining debris before the new fully, and thoroughly cleaned water is returned to storage tank 20 for reuse.

The Hydrocarbon Removal Apparatus

Bags or pillow 100 which float on the surface 110 of reclamation tank 400 and which are housed in canister 500 are conventional oil absorbent bags filled with hydrocarbon absorbent material. The outer enclosure of the bags 100 is about 8 inches in diameter and about 20 inches long and is made of a mesh, fabric or plastic, material, such as cloth, nylon, cotton, polyester or similar material having holes about ⅛–¼" in diameter which is sufficient to allow hydrocarbon materials suspended in or floating on the water to enter the bag through the holes. The interior of the bag is filled with a polypropylene material of the polyolefin chemical family $(C_3H_5)n$ and is comprised 0.3% blue pigment, 1% other ingredients and about 98.7% polypropylene by weight. A material of this type is well known in the trade and is sold by Matarah Industries, Inc. of Milwaukee, Wis., under the trademark Matasorb. The polypropylene material 120 stable, non-toxic, non-hazardous, odor-free, blue in color, and insoluble in water but is porous and highly absorbent of hydrocarbons, such as oil and fuel. It has a specific gravity of about 0.9 and a melting point of about 320° F. and a flashpoint adequation temperature of about 850°. When ignited it is extinguished by a water spray. It may be disposed of by normal incineration or landfill. It requires no special clothing when in use. An additional material is a polycarbonated spun polypropylene which has been subjected to a carbonation process which causes it to swell and become more porous and flaky in structure and consistency. This material comes apart more easily, but is still quite hydrocarbon absorbent, especially for oil and fuels, and, therefore, satisfactory. The bags or pillows 100 retain the absorbed hydrocarbons in their interstices, like a sponge holds water. The hydrocarbon may be removed from the bags by squeezing the bag as one squeezes a sponge, or by disposing of the bag itself when it has lost its absorbent qualities through use.

Polypropylene bags 100 of the type described are well known in the prior art for use in absorbing oil spills on water, such as oceans but have not been used heretofore as hydrocarbon absorbent bags in the containment of reclamation and filtration tanks in high pressure, high temperature cyclonic power wash environments as described in the present invention.

In use, one or more of the polypropylene bags or pillows 100 are placed in each compartment of the filtration tank where they float on the surface 110 of the water. As recycled water fills each compartment and cascades over a wall 31 to the next adjacent compartment, the oil, fuel and other hydrocarbons suspended in or floating on the surface of the water 110 enter the holes in the bags or pillows 100 and are absorbed by the interior polypropylene material 120. Similarly, several bags 100 may be placed in round, canister type filters 500 where they are effective in absorbing hydrocarbons which escaped the pillows 100 in the reclamation tank 400. In the preferred embodiment, applicant uses six (6) canister filters in series, each having two polypropylene bags 100 therein.

In practice applicant has found that the recycled water is clear, clean and free of hydrocarbons if the bags 100 are removed at the end of 8–10 hours use, or on completion of a job of less, and squeezed in a 1,500 lb. compression apparatus, as one squeezes a mop. The removed hydrocarbons are collected and returned to the owner of the surfaces being cleaned for deposition. The bags 100 may then be replaced and reused. They may also be cleansed by washing with soap and water. After 15–20 recycles, the bags 100 are disposed of by incineration or landfill.

Applicant has found the above described process to perform excellently in cleaning large surfaces of hydrocarbon efficiently and continuously without stopped to replenish the water in tank 20 or the need to go to a waste disposal to drain the collected waste materials while at the same time segregation and collecting the removed hydrocarbons without sending the hydrocarbons down drains or otherwise creating environmental hazards. The hydrocarbon removed and collected by the present processes are disposed of by the owner of the cleaned surface in accordance with well known procedures and regulations which are beyond the scope of the present invention. The recycled water is constantly cleaning itself in the system of the present invention. Hydrocarbons removed by the present invention from one portion of the surface being cleaned are not relaid onto another portion of the surface being cleaned. Instead, they are totally isolated segregated and removed from the surface and separately packaged and disposed of.

In the preferred embodiment, applicant uses two (2) polishing filters 501 in series. The filters contain conventional screens made of paper, fiber or fine metal mesh capable of screening out the debris having particle sizes larger than 20 microns in the upstream polishing filter 501 and larger than 5 microns in the downstream polishing filter 501. The final recycled water is hereby "polished", this is cleared of any final small debris.

A working model of the invention can be made using the following specifications:

Trailer: 10' long, weights 1200 lbs. with ⅛" steel deck, 7000 lb. capacity, by Fleming Trailers, Glendale, Ariz.

Storage Tank: 300 gallon capacity, fiberglass or poly material by Desert Sun Fiberglass, Phoenix, Ariz.

Water Pump: Triplex piston, 3000 psi, 8 gallon/min pumping capacity, fan belt drive, by Giant Indus.;

Electric Generator: 2200 watts, 110 volts at 2700 rpm, fan belt drive by T&J Mfg. Co., Oshkosh, Wis.;

Gas Engine For Water Pump And Electric Generator: 20–25 hp., 2 cylinder gas engine, 2700 rpm constant speed, double pulley output by Kohler, Kohler, Wis.;

Oil Burner: 450,000–1,000,000 BTU depending on fuel nozzle size. A 3.50 nozzle yields 520,000 BTU's by Beckett Indus., Elirya, Ohio;

Heating Coil: ½" steel pipe, schedule 80, 150' of coil by Farley's, Siloam Springs, Ariz.;

Cyclone Sprayer: 4500 psi max, 10 gallon/min. at 250° F., 2000 rpm max, 1500 rpm operating speed, with either 18", 30" or 48" spray bar; any size nozzle from No. 2 (0.034 ID nozzle) to No. 10 (0.080 ID nozzle); nozzles oriented at 6° to 20° downward vertical angle perpendicular to spray bar longitudinal axis; No. 305 stainless steel spray bar; four (4) 10" rustproof standard rubber tires; T-6 aircraft grade aluminum cover and deck; mild steel handle; 7200 psi lever type shut off valve; 360° rubber rock guard around bottom of cyclone;

Reclamation Ring:. 120" thick walls, 1" diameter mild steel tubing, about 170 ⅛" D holes in a 30" diameter reclamation ring;

Vacuum Pump: 14" Hg., 280 ft.$^3$ air flow per minute, through 2" spined poly hoses. Pump by Suttorbuilt Div. of Gardner-Denver, Chicago, Ill.;

Gas Engine Drive For Vacuum Pump: 20–25 HP, 12 volt battery started, Kohler 2 cylinder gas engine, 2700 rpm constant speed, direct drive by Kohler, Kohler, Wis.;

Vacuum Pump Silencer: 3" model D-33, Stoddard Silencers, Grayslake, Ill.;

Reclamation Tank: 170 gal. capacity; ½" abs plastic, by Proto Plastics, Glendale, Ariz.; 12" battery powered float operated on/off switch which is "on" when water reaches about 7" and "off" when water reaches about 3" from the bottom of tank; ½" one-way, spring loaded, water check valve opened by the weight of water present in the inlet of the valve;

Gas Engine Muffler: standard Chevrolet muffler;

Water Pump For Line From Filter Tank To Storage Tank: 12 volt battery powered from the gas engine battery, 6 gallon/min capacity.

The foregoing description of a preferred embodiment and best mode of the invention known to applicant at the time of filing the application has been presented for the purpose of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to be particular use contemplated. It is intended that the scope of the invention be defined by the claims appended hereto.

What is claimed:

1. A cyclonic power wash system using high pressure water for selectively cleaning flat surfaces in which the system includes a water storage means for holding water to be used for cleaning, a water pumping system for pumping and pressurizing the water from the storage means, a water cyclone sprayer for spraying the water onto the surfaces, and a water reclamation and filter recycling system for reclaiming and filtering the sprayed water and recycling the filtered water back into the water storage means so that it can be further used for cleaning by the power wash system wherein the improvement comprises: a plurality of bags of substantially polypropylene, hydrocarbon absorbent material contained within the water reclamation and filter recycling system for absorbing hydrocarbon substances suspended in or floating on the surface of the recycled water.

2. The mobile cyclonic power wash system of claim 1 wherein the water reclaiming and filter recycling system includes a reclamation system having a plurality of cascading chambers for receiving the reclaimed water and allowing the water to successively spill over from one chamber to another chamber wherein the improvement further comprises:

at least one of the bags constrained within each chamber floating on the surface of the water.

3. The mobile cyclonic power wash system of claim 1 wherein the reclaiming and filter recycling system includes at least one downstream canister filter wherein the improvement further comprises:

at least one of the bags in each canister filter.

4. The mobile cyclonic power wash system of claim 3 further comprises:

the canister filter is downstream of a reclamation filtration tank having a plurality of the bags constrained therein.

5. The mobile cyclonic power wash system of claim 1 wherein each bag contains about 98.7% polypropylene material.

6. The mobile cyclonic power wash system of claim 1 wherein the polypropylene material has been subjected to a carbonation treatment that makes it more porous while remaining insoluble in water.

7. The mobile cyclonic power system of claim 1 further comprises:

a water heating system for heating the water to a high temperature.

8. The mobile cyclonic power system of claim 1 further comprises:

the bags being removable, the hydrocarbons absorbed in the bags being readily removable from the bags and separately collectable;

and the bags being reusable in the filter recycling system for further absorption of hydrocarbon substances.

* * * * *